United States Patent
Sundermann et al.

(10) Patent No.: US 7,708,524 B2
(45) Date of Patent: May 4, 2010

(54) METHOD AND SYSTEM FOR UTILIZING LATERAL TOWER ACCELERATION TO DETECT ASYMMETRIC ICING

(75) Inventors: Bastian Sundermann, Berlin (DE); Christian Siuts, Berlin (DE); Hubert Oing, Berlin (DE)

(73) Assignee: General Electric Company, Schenectady, NY (US)

( * ) Notice: Subject to any disclaimer, the term of this patent is extended or adjusted under 35 U.S.C. 154(b) by 803 days.

(21) Appl. No.: 11/643,457

(22) Filed: Dec. 21, 2006

(65) Prior Publication Data

US 2008/0152493 A1    Jun. 26, 2008

(51) Int. Cl.
*F03D 7/04* (2006.01)
(52) U.S. Cl. .......................... 416/39; 416/61
(58) Field of Classification Search ............... 416/39; 73/455
See application file for complete search history.

(56) References Cited

U.S. PATENT DOCUMENTS

| | | | |
|---|---|---|---|
| 5,140,856 A * | 8/1992 | Larsen | 73/455 |
| 6,966,754 B2 * | 11/2005 | Wobben | 416/61 |
| 7,487,673 B2 * | 2/2009 | Ormel et al. | 416/39 |
| 2004/0108729 A1 * | 6/2004 | Wobben | 290/44 |
| 2005/0276696 A1 * | 12/2005 | LeMieux | 416/61 |

FOREIGN PATENT DOCUMENTS

EP    1748185 A1    1/2007

OTHER PUBLICATIONS

Martin Mayr: Optimized Operation of Wind Turbines In Cold Climate Regions, Diploma Thesis at Johannes Kepler Universitat Linz, In Cooperation With GE Global Research, 2005, Linz, Austria.

* cited by examiner

*Primary Examiner*—Richard Edgar
(74) *Attorney, Agent, or Firm*—Dale J. Davis; Ernst G. Cusick; Frank A. Landgraff

(57) ABSTRACT

A method and system for detecting asymmetric utilizing lateral tower acceleration data may include: providing a lateral tower acceleration monitoring system; determining from the lateral tower acceleration monitoring system whether a lateral tower acceleration is above an acceleration limit; determining whether a rotor-mass imbalance condition exists; and determining whether the lateral tower acceleration coincides with icing on a rotor.

20 Claims, 5 Drawing Sheets

METHOD AND SYSTEM FOR UTILIZING LATERAL TOWER ACCELERATION TO DETECT ASYMMETRIC ICING

BACKGROUND OF THE INVENTION

The present invention relates to ice accumulation occurring on the rotor blades of a wind turbine; and more particularly a method and system for detecting asymmetric icing.

Wind turbines are commonly installed in areas where the climatic conditions allow for ice accumulation (hereinafter icing). Icing on the rotor blades (hereinafter blades) of a wind turbine typically leads to several problems including a reduction in power output; and higher stresses on several components. Icing may be divided into two forms, symmetric (icing on all blades) and asymmetric, (icing on some blades). Asymmetric icing increases the wind turbine tower vibration, and increases the lateral tower acceleration. Asymmetric icing may also yield a rotor-mass imbalance leading to higher fatigue loads, and thus requiring more robust and expensive wind turbine components.

Current systems of detecting asymmetric icing typically require additional hardware such as sensors, anemometers, piezoelectric transducers, or the like. Moreover, wind turbine operators generally must purchase and install this additional hardware.

There are a few problems with the current systems and methods for addressing icing. The requirement of additional hardware increases the installation and operational costs of the wind turbine. Furthermore, for geographical areas having an average yearly temperature above freezing, the additional costs associated with detecting asymmetric icing may prohibit wind turbine operation.

For the foregoing reasons, there is a need for a method and system for detecting asymmetric icing utilizing existing wind turbine hardware. The method should not require additional hardware. Furthermore, the method should incorporate lateral tower acceleration data to detect asymmetric icing.

BRIEF DESCRIPTION OF THE INVENTION

In accordance with an embodiment of the present invention, a method of detecting asymmetric icing on a wind turbine includes: providing a lateral tower acceleration monitoring system; determining from the lateral tower acceleration monitoring system whether a lateral tower acceleration is above an acceleration limit; determining whether a rotor-mass imbalance condition exists; and determining whether the lateral tower acceleration coincides with icing on a rotor.

In accordance with another embodiment of the present invention, a system for detecting asymmetric icing on a wind turbine includes a lateral tower acceleration monitoring system; means for determining whether a lateral tower acceleration is above an acceleration limit from the lateral tower acceleration monitoring system; means for determining whether a rotor-mass imbalance condition exists; and means for determining whether the lateral tower acceleration coincides with icing on a rotor.

In accordance with another embodiment of the present invention, a wind turbine includes: a tower; a nacelle; a lateral tower acceleration monitoring system; means for receiving tower vibration data and means for determining whether a lateral tower acceleration is above an acceleration limit from the lateral tower acceleration monitoring system; means for determining whether a rotor-mass imbalance condition exists comprising: means for receiving a rotor speed and means for determining whether a lateral tower acceleration frequency is approximately a rotor frequency; or means for receiving a rotor position and means for determining whether a maximum tower acceleration repeatedly occurs near the rotor location where the immediately previous maximum tower acceleration occurred; means for determining whether the lateral tower acceleration coincides with icing on a rotor, wherein the rotor comprises a plurality of blades; means for receiving at least one ambient weather condition and means for determining whether at least one blade of the plurality of blades has a potential for icing; means for determining which blade of the plurality of blades is experiencing icing; and means for providing notification on which blade of the plurality of blades is experiencing icing.

In accordance with another embodiment of the present invention, a method of detecting asymmetric icing on a wind turbine, the method comprising: providing a lateral tower acceleration monitoring system; receiving tower vibration data and determining whether a lateral tower acceleration is above an acceleration limit; determining whether a rotor-mass imbalance condition exists comprising: receiving a rotor speed and determining whether a lateral tower acceleration frequency is approximately a rotor frequency; or receiving a rotor position and determining whether a maximum tower acceleration repeatedly occurs near the rotor location where the immediately previous maximum tower acceleration occurred; determining whether the lateral tower acceleration coincides with icing on a rotor, wherein the rotor includes a plurality of blades; receiving at least one ambient weather condition and determining whether at least one blade of the plurality of blades has a potential for icing; and determining which blade of the plurality of blades is experiencing icing; and providing notification on which blade of the plurality of blades is experiencing icing.

DETAILED DESCRIPTION OF THE INVENTION

Figure 1:
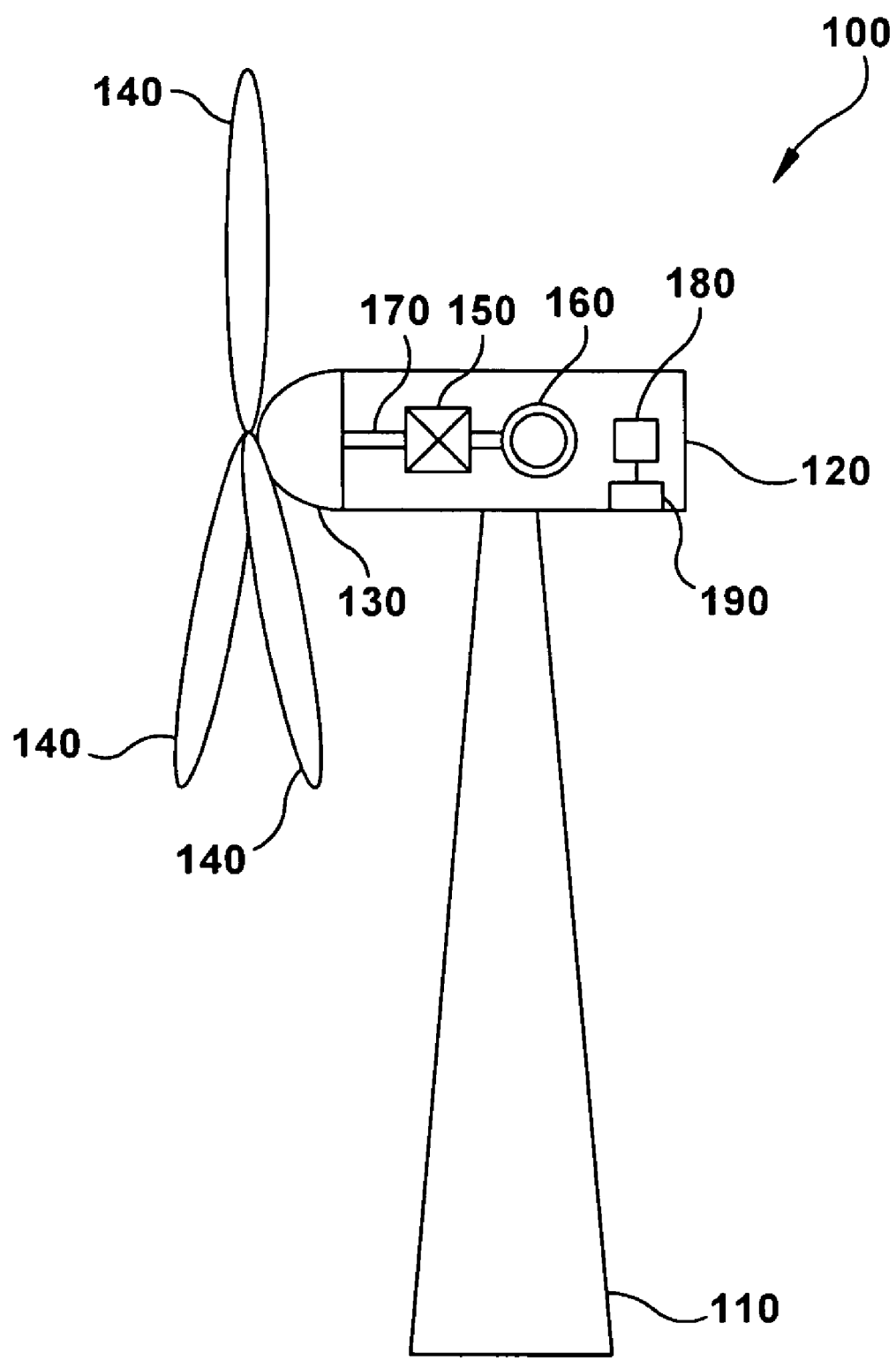
FIG. 1 is a schematic illustrating the environment in which an embodiment of the present invention operates.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

An embodiment of the present invention takes the form of a software application and process that utilizes lateral tower acceleration data to detect asymmetric icing on a wind turbine. The present invention can be applied to many forms of wind turbines (hereinafter turbine) including those located in regions, which may not typically have atmospheric conditions that support icing.

The present invention may be configured to automatically or continuously monitor lateral tower acceleration while the turbine operates, to determine whether or not asymmetric icing may be occurring. Alternatively, the present invention may be configured to require a user action to initiate operation.

The present invention may function as a stand-alone system. Alternatively, the present invention may be integrated as a module, or the like, within a broader system, such as a turbine control or a plant control system.

FIG. 1 is a schematic illustrating the environment in which an embodiment of the present invention operates. Therein, a turbine 100 includes a tower 110 on which a nacelle 120 is mounted. At a lateral end of the nacelle 120, a hub 130 is mounted which supports a plurality of blades 140. As illustrated, disposed within the nacelle 120 are a gear box 150 and a generator 160. The gear box 150 and the generator 160 are connected to the hub 130 via a drive train 170. Furthermore, an asymmetric icing detection system 180 (hereinafter system 180) may also be disposed within the nacelle 120. Communicating with the system 180 is a sensor 190. The sensor 190 measures the tower vibration. One advantage of the present invention is that the sensor 190 is a normal component of a turbine 100. Therefore, a user is not required to purchase, install, and maintain and a new sensor.

An embodiment of the system 180 of the present invention receives vibration data from the sensor 190 to determine whether or not at least one blade 140 may be experiencing icing.

Figure 2A:
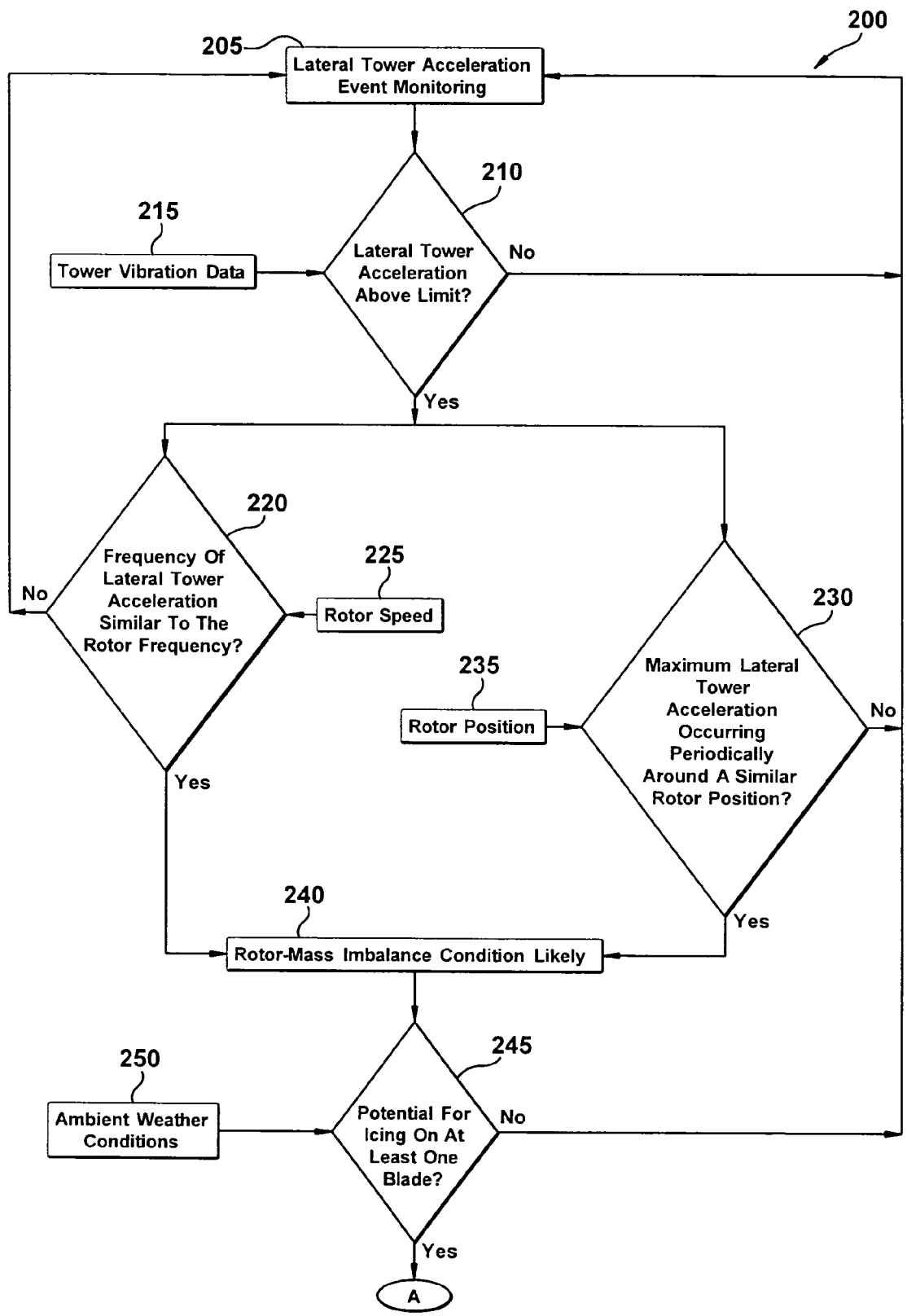
FIGS. 2A and 2B (collectively FIG. 2) are flowcharts illustrating an example of a method of detecting asymmetric icing in accordance with an embodiment of the present invention.
Figure 2B:
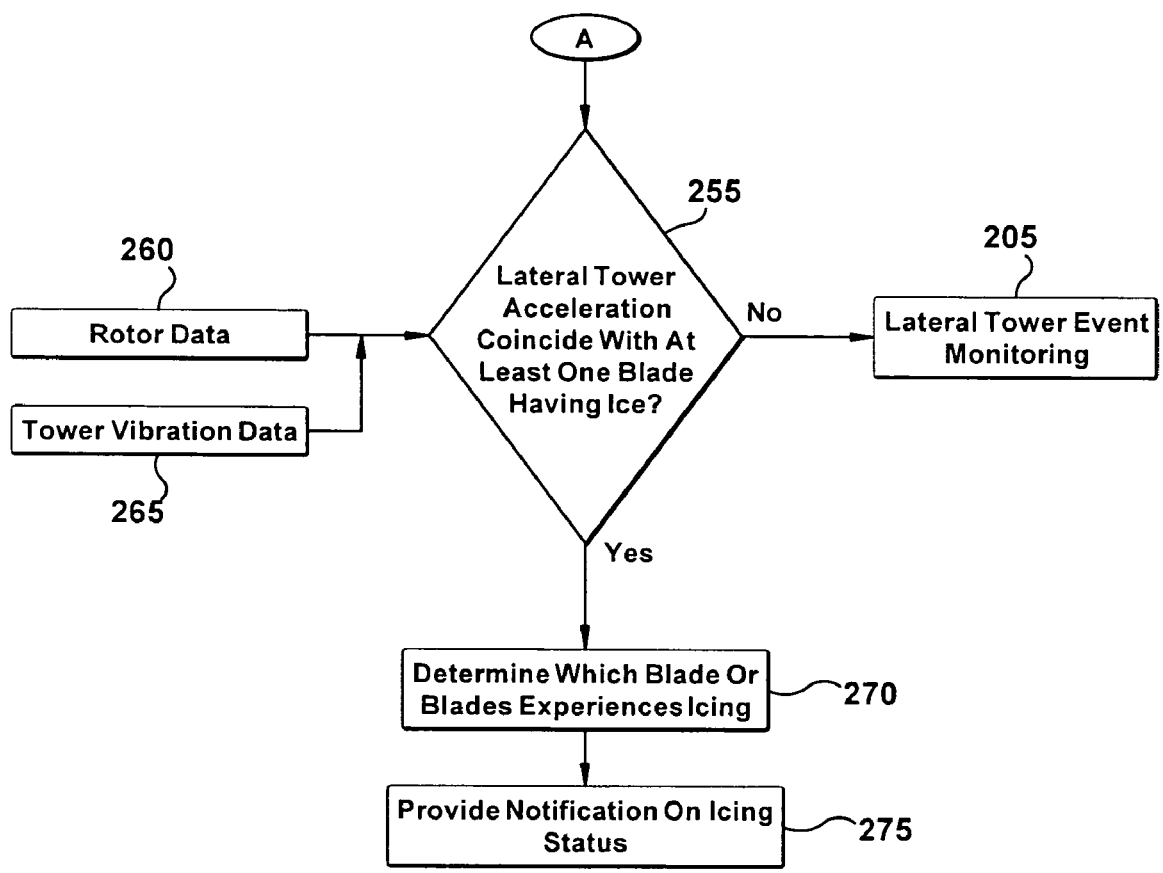

Referring now to FIGS. 2A and 2B (collectively FIG. 2), which are a flowchart illustrating a method 200 of detecting asymmetric icing, in accordance with an embodiment of the present invention. In step 205, the method 200 is enabled to monitoring the activity of a turbine. An embodiment of the method 200 may be configured to continuously operate to determine whether or not icing may be occurring on at least one blade.

In step 210, the method 200 determines whether or not the lateral tower acceleration is above a limit. Step 210 incorporates actual tower vibration data to calculate a lateral tower acceleration, which is then compared to a preconfigured acceleration limit. Referring back FIG. 1, the present invention may receive actual tower vibration data from sensor 190. Referring again to step 210, the preconfigured acceleration limit may be a user settable parameter. Alternatively, the preconfigured acceleration limit may be received by step 210 from another control system, such as a plant control system, or the like. As illustrated, the method 200 at step 210 receives the tower vibration data from step 215. If the lateral tower acceleration does not exceed the limit, then the method 200 reverts to step 205, otherwise the method 200 proceeds to either step 220 or step 230.

The present invention may be utilized on a turbine that has at least one sensor that can provide either rotor speed data or rotor position data to the method 200. If the present invention is implemented on a turbine having a sensor that provides rotor speed, then the method 200 proceeds from step 210 to step 220; otherwise if the present invention is implemented on a turbine having a sensor that provides rotor position, then the method 200 proceeds from step 210 to step 230.

In step 220, the method 200 determines whether or not the frequency of the lateral tower acceleration is similar to the rotor frequency. Step 220 compares the frequency of the lateral tower acceleration of step 210 to the actual rotor speed. As illustrated, step 220 receives the rotor speed data from step 225. As discussed, the rotor speed data may be received from a preexisting sensor on the turbine. If the frequency of the lateral tower acceleration is similar to the actual rotor speed, then the method 200 proceeds to step 240; otherwise the method 200 reverts to step 205.

In step 230, the method 200 determines whether or not the maximum lateral tower acceleration occurs periodically around the same rotor position. Step 230 first determines the value of maximum lateral tower acceleration. Next, step 230 determines whether or not that value is repeatedly occurring at or near the same rotor position. As illustrated, step 230 receives the rotor position data from step 235. As discussed, the rotor position data may be received from a preexisting sensor on the turbine. If the maximum lateral tower acceleration is repeatedly occurring at or near the same rotor position, then the method 200 proceeds to step 240; otherwise the method 200 reverts to step 205.

In step 240, the method 200 has determined that a rotor-mass imbalance condition is likely. The method 200 may be configured to provide a notification that a rotor-mass imbalance condition is likely. The notification may be an alarm of varying forms such as, but not limited to, an audio signal, a graphic, or a text message.

In step 245, the method 200 determines whether or not there is a potential for icing on at least one blade. Step 245 utilizes ambient weather condition data to determine whether or not icing could occur. For example, but not limited to, an embodiment of the present invention may utilize temperature, humidity, and air pressure in determining whether or not icing may occur. As illustrated, step 245 receives the ambient weather condition data from step 250. Turbines typically have hardware that provides ambient weather condition data and thus the present invention does not require additional hardware. If step 245 determines that the ambient weather conditions support icing, then the method 200 proceeds to step 255; otherwise the method 200 reverts to step 205.

In step 255, the method 200 determines whether or not the actual lateral tower acceleration coincides with lateral tower accelerations due to at least one blade having ice. As illustrated, step 255 receives rotor data (such as rotor position or rotor speed) from step 260, and tower vibration data from step 265. Next, step 255 utilizes the received data to calculate a range of lateral tower accelerations that may result from icing on at least one blade. The calculated lateral tower accelerations are then compared to the actual lateral tower acceleration determined in step 210. Alternatively, an embodiment of the present invention may compare the actual lateral tower acceleration to a previously stored or estimated value. If step 255 determines that the actual lateral tower acceleration coincides with the calculated lateral tower accelerations, then the method 200 proceeds to step 270; otherwise the method 200 reverts to step 205. Alternatively, if step 255 determines that the actual lateral tower acceleration coincides with the estimated or stored lateral tower accelerations, then the method 200 proceeds to step 270; otherwise the method 200 reverts to step 205.

In steps 270, the method 200 determines which blades or blades may be experiencing icing. For example, but not limited to, the method 200 in step 270 may determine if icing occurs on a blade1, or a blade2, or a blade3, or any and all combinations thereof. Furthermore, in step 275, the method 200 may provide notification of which blade or blades may be experiencing icing. Similar to step 240, the notification may be an alarm of varying forms such as, but not limited to, an audio signal, a graphic, or a text message. Furthermore, the method 200 may be configured to transmit the icing status to other control systems, such as the turbine control system, plant control system, or the like.

Figure 3:
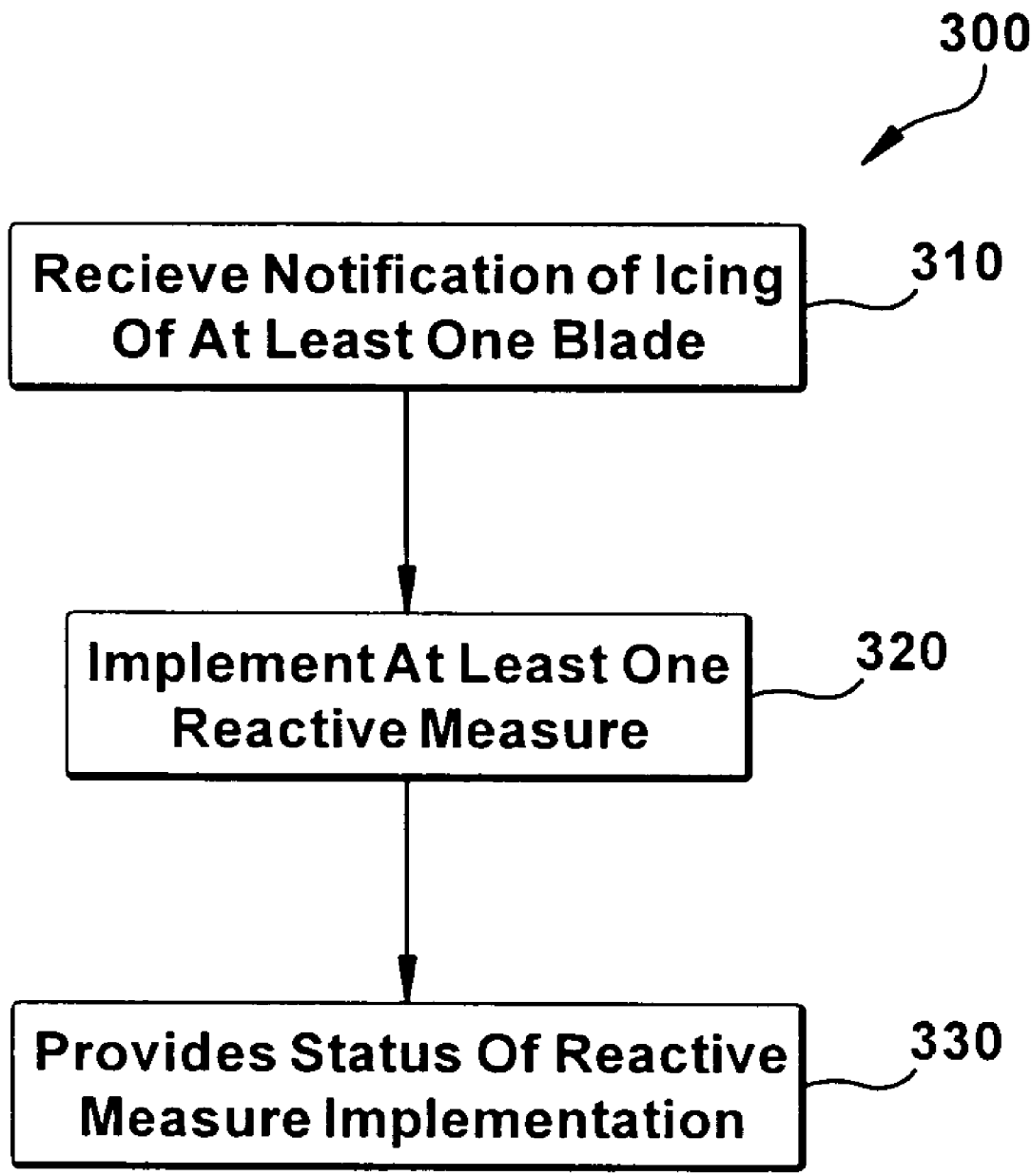
FIG. 3 is a flowchart illustrating an example of a method of responding to a detection of asymmetric icing in accordance with an embodiment of the present invention.

Referring now to FIG. 3, which is a flowchart illustrating an example of a method of responding to a detection of asymmetric icing in accordance with an embodiment of the present invention.

In step 310, the method 300, receives a notification of icing of at least one blade from the method 200. Here, the method 300 may take the form of a control system. The control system may include for example, but not limited to, a turbine control system, a plant control system, or the like. The notification may be received by the control system, for example, but not limited to, via a wired, wireless, or other forms of electronically transmitting the notification.

In step 320, the method 300, may implement at least one reactive measure to reduce or remove the icing. A reactive measure may include for example, but not limited to, reducing the rotor speed, lowering a power generation set point, braking procedures, or the like.

In step 330, the method 300, provides a status notification on the reactive measure (s) that was implemented. The notification may be an alarm of varying forms such as, but not limited to, an audio signal, a graphic, or a text message.

Figure 4:
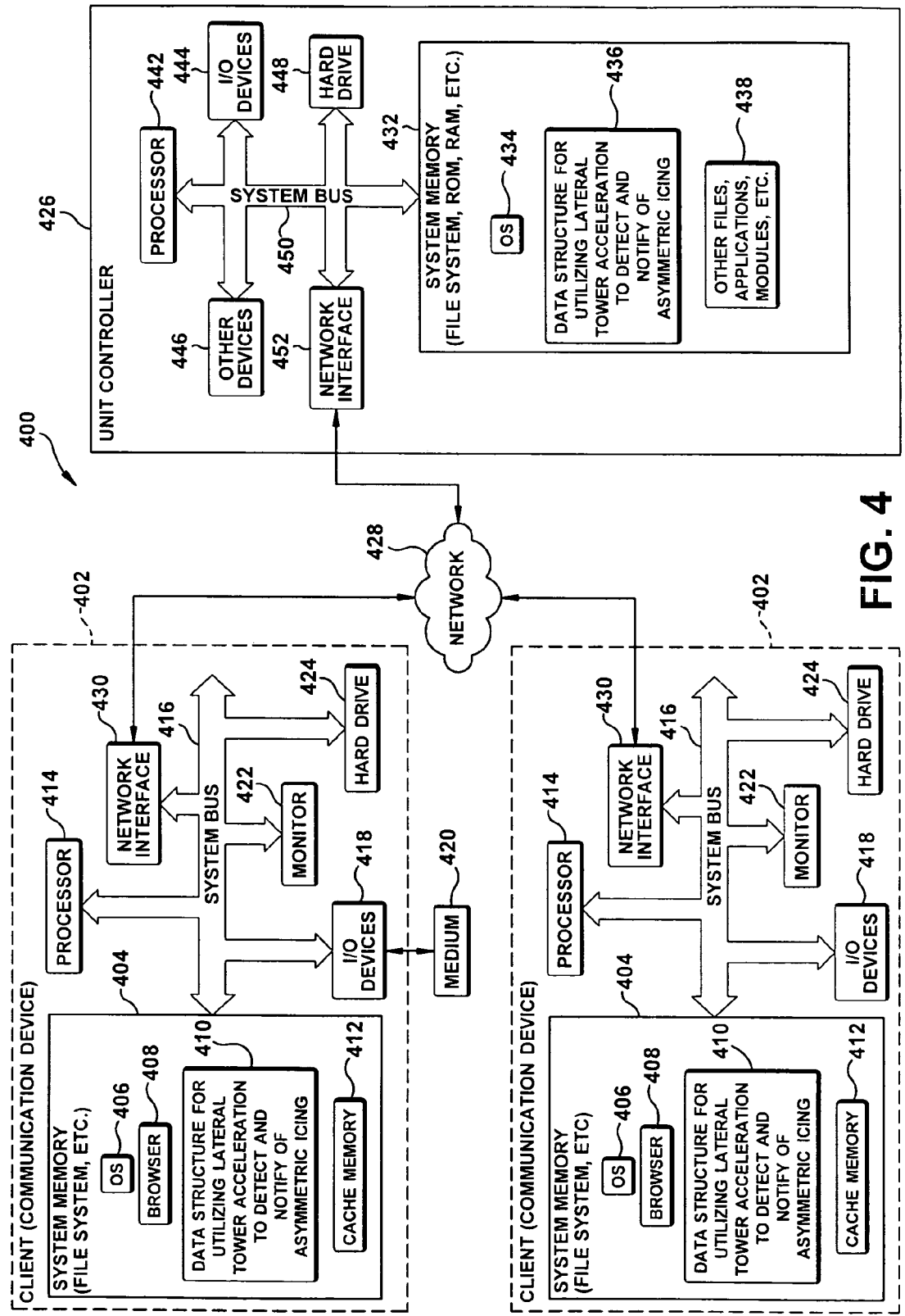
FIG. 4 is a block diagram of an exemplary system for detecting asymmetric icing in accordance with an embodiment of the present invention.

FIG. 4 is a step diagram of an exemplary system 200 to detect asymmetric icing in accordance with an embodiment of the present invention. The elements of the method 200 may be embodied in and performed by the system 400. The system 400 may include one or more user or client communication devices 402 or similar systems or devices (two are illustrated in FIG. 4). Each communication device 402 may be for example, but not limited to, a computer system, a personal digital assistant, a cellular phone, or similar device capable of sending and receiving an electronic message.

The communication device 402 may include a system memory 404 or local file system. The system memory 404 may include for example, but not limited to, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code to detect asymmetric icing that may be similar or include elements of the method 200 in FIGS. 2A and 2B.

The system memory 404 may further include a template cache memory 412, which may be used in conjunction with the method 200 in FIGS. 2A and 2B to automatically store data from the most recent asymmetric icing detection.

The communication device 402 may also include a processor or processing unit 414 to control operations of the other components of the communication device 402. The operating system 406, browser 408, data structures 410 may be operable on the processor 414. The processor 414 may be coupled to the memory system 404 and other components of the communication device 402 by a system bus 416.

The communication device 402 may also include multiple input devices, output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to detect asymmetric icing. The I/O devices 418 may include a keyboard and computer pointing device or the like to perform the operations discussed herein.

The I/O devices 418 may also include for example, but not limited to, disk drives, optical, mechanical, magnetic, or infrared input/output devices, modems or the like. The I/O devices 418 may be used to access a medium 420. The medium 420 may contain, store, communicate or transport computer-readable or computer-executable instructions or other information for use by or in connection with a system, such as the communication devices 402.

The communication device 402 may also include or be connected to other devices, such as a display or monitor 422. The monitor 422 may be used to permit the user to interface with the communication device 402.

The communication device 402 may also include a hard disk drive 424. The hard drive 424 may be coupled to the system bus 416 by a hard drive interface (not shown in FIG. 4). The hard drive 424 may also form part of the local file system or system memory 404. Programs, software and data may be transferred and exchanged between the system memory 404 and the hard drive 424 for operation of the communication device 402.

The communication devices 402 may communicate with a remote server 426 and may access other servers or other communication devices similar to communication device 402 via a network 428. The system bus 416 may be coupled to the network 428 by a network interface 430. The network interface 430 may be a modem, Ethernet card, router, gateway or the like for coupling to the network 428. The coupling may be a wired connection or wireless. The network 428 may be the Internet, private network, an intranet or the like.

The server 426 may also include a system memory 432 that may include a file system, ROM, RAM and the like. The system memory 432 may include an operating system 434 similar to operating system 406 in communication devices 402. The system memory 432 may also include data structures 436 to detect asymmetric icing of a turbine. The data structures 436 may include operations similar to those described with respect to the method 200 for detecting asymmetric icing in accordance with an embodiment of the present invention. The server system memory 432 may also include other files 438, applications, modules and the like.

The server 426 may also include a processor 442 or a processing unit to control operation of other devices in the server 426. The server 426 may also include I/O device 444. The I/O devices 444 may be similar to I/O devices 418 of communication devices 402. The server 426 may further include other devices 446, such as a monitor or the like to provide an interface along with the I/O devices 444 to the server 426. The server 426 may also include a hard disk drive 448. A system bus 450 may connect the different components of the server 426. A network interface 452 may couple the server 426 to the network 428 via the system bus 450.

The flowcharts and step diagrams in the Figures illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of detecting asymmetric icing on a wind turbine, the method comprising:
    providing a lateral tower acceleration monitoring system;
    determining from the lateral tower acceleration monitoring system whether a lateral tower acceleration is above an acceleration limit;
    determining whether a rotor-mass imbalance condition exists; and
    determining whether the lateral tower acceleration coincides with icing on a rotor.

2. The method of claim 1, wherein determining whether the lateral tower acceleration is above an acceleration limit comprises receiving tower vibration data to be used in the step of determining whether the lateral tower acceleration is above an acceleration limit.

3. The method of claim 1, wherein determining whether a rotor-mass imbalance condition exists comprises determining whether a lateral tower acceleration frequency is approximately a rotor frequency.

4. The method of claim 3 further comprising the step of receiving a rotor speed.

5. The method of claim 1, wherein determining whether a rotor-mass imbalance condition exists comprises determining whether a maximum tower acceleration repeatedly occurs near the rotor location where the immediately previous maximum tower acceleration occurred.

6. The method of claim 5 further comprising the step of receiving a rotor position.

7. The method of claim 1 wherein the rotor comprises a plurality of blades, the method further comprising determining whether at least one blade of the plurality of blades has a potential for icing.

8. The method of claim 7 wherein the step of determining whether at least one blade of the plurality of blades has a potential for icing further comprises the step of receiving at least one ambient weather condition.

9. The method of claim 1, wherein the step of determining whether the lateral tower acceleration coincides with icing on a rotor comprises receiving a rotor position.

10. The method of claim 1 further comprising:
determining which blade of the plurality of blades is experiencing icing; and
providing notification on which blade of the plurality of blades is experiencing icing.

11. A system for detecting asymmetric icing on a wind turbine, the system comprising:
a lateral tower acceleration monitoring system;
means for determining whether a lateral tower acceleration is above an acceleration limit from the lateral tower acceleration monitoring system;
means for determining whether a rotor-mass imbalance condition exists; and
means for determining whether the lateral tower acceleration coincides with icing on a rotor.

12. The system of claim 11, wherein the means for determining whether the lateral tower acceleration is above an acceleration limit comprises means for receiving tower vibration data.

13. The system of claim 11, wherein the means for determining whether a rotor-mass imbalance condition exists comprises:
means for determining whether a lateral tower acceleration frequency is approximately a rotor frequency; and
means for receiving a rotor speed.

14. The system of claim 11, wherein determining whether a rotor-mass imbalance condition exists comprises:
means for determining whether a maximum lateral tower acceleration repeatedly occurs near the rotor location where the immediately previous maximum tower lateral acceleration occurred; and
means for receiving a rotor position.

15. The system of claim 11, wherein the rotor comprises a plurality of blades, the method further comprising means for determining whether at least one blade of the plurality of blades has a potential for icing.

16. The system of claim 15 wherein the means for determining whether at least one blade of the plurality of blades has a potential for icing further comprises means for receiving at least one ambient weather condition.

17. The system of claim 11, wherein the means for determining whether the lateral tower acceleration coincides with icing on a rotor comprises means for receiving a rotor position.

18. The system of claim 11 further comprising:
means for determining which blade of the plurality of blades is experiencing icing; and
means for providing notification on which blade of the plurality of blades is experiencing icing.

19. A wind turbine comprising:
a tower;
a nacelle;
a lateral tower acceleration monitoring system;
means for receiving tower vibration data and means for determining whether a lateral tower acceleration is above an acceleration limit from the lateral tower acceleration monitoring system;
means for determining whether a rotor-mass imbalance condition exists comprising:
means for receiving a rotor speed and means for determining whether a lateral tower acceleration frequency is approximately a rotor frequency; or
means for receiving a rotor position and means for determining whether a maximum tower acceleration repeatedly occurs near the rotor location where the immediately previous maximum tower acceleration occurred;
means for determining whether the lateral tower acceleration coincides with icing on a rotor, wherein the rotor comprises a plurality of blades;
means for receiving at least one ambient weather condition and means for determining whether at least one blade of the plurality of blades has a potential for icing;
means for determining which blade of the plurality of blades is experiencing icing; and
means for providing notification on which blade of the plurality of blades is experiencing icing.

20. A method of detecting asymmetric icing on a wind turbine, the method comprising:
providing a lateral tower acceleration monitoring system;
receiving tower vibration data and determining whether a lateral tower acceleration is above an acceleration limit;
determining whether a rotor-mass imbalance condition exists comprising:
receiving a rotor speed and determining whether a lateral tower acceleration frequency is approximately a rotor frequency; or
receiving a rotor position and determining whether a maximum tower acceleration repeatedly occurs near the rotor location where the immediately previous maximum tower acceleration occurred;
determining whether the lateral tower acceleration coincides with icing on a rotor, wherein the rotor includes a plurality of blades;
receiving at least one ambient weather condition and determining whether at least one blade of the plurality of blades has a potential for icing; and
determining which blade of the plurality of blades is experiencing icing; and
providing notification on which blade of the plurality of blades is experiencing icing.

* * * * *